United States Patent
Mödl et al.

(10) Patent No.: US 7,287,272 B1
(45) Date of Patent: Oct. 23, 2007

(54) METHOD, DATA CARRIER AND SYSTEM FOR AUTHENTICATION OF A USER AND A TERMINAL

(75) Inventors: Albert Mödl, Gersthofen (DE); Elmar Stephan, Munich (DE); Robert Müller, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 903 days.

(21) Appl. No.: 10/030,162

(22) PCT Filed: Jul. 25, 2000

(86) PCT No.: PCT/EP00/07122

§ 371 (c)(1),
(2), (4) Date: Apr. 25, 2002

(87) PCT Pub. No.: WO01/09849

PCT Pub. Date: Feb. 8, 2001

(30) Foreign Application Priority Data

Jul. 30, 1999 (DE) ................................. 199 35 945

(51) Int. Cl.
*H04L 9/00* (2006.01)
(52) U.S. Cl. .......................................................... 726/5
(58) Field of Classification Search ................ 713/169, 713/186; 726/5, 20, 169, 186
See application file for complete search history.

(56) References Cited

U.S. PATENT DOCUMENTS

| | | | |
|---|---|---|---|
| 4,746,788 A | 5/1988 | Kawana | |
| 5,036,461 A * | 7/1991 | Elliott et al. | 705/44 |
| 5,208,447 A | 5/1993 | Kruse | |
| 5,239,166 A | 8/1993 | Graves | |
| 5,272,754 A * | 12/1993 | Boerbert | 713/159 |
| 5,721,781 A | 2/1998 | Deo et al. | |
| 5,892,838 A * | 4/1999 | Brady | 382/115 |
| 5,930,804 A * | 7/1999 | Yu et al. | 707/104.1 |
| 6,424,249 B1 * | 7/2002 | Houvener | 340/5.82 |

FOREIGN PATENT DOCUMENTS

| | | |
|---|---|---|
| DE | 4231913 | 1/1994 |
| DE | 196 48 767 A1 | 6/1997 |
| DE | 19755092 | 6/1999 |
| EP | 0 552 392 A1 | 7/1993 |
| EP | 0875868 | 4/1998 |

\* cited by examiner

*Primary Examiner*—Gilberto Barrón, Jr.
*Assistant Examiner*—Thomas M Ho
(74) *Attorney, Agent, or Firm*—Bacon & Thomas, PLLC

(57) ABSTRACT

A data carrier has stored thereon a secret code and a user's biometric data. In using the data carrier, a data carrier terminal is first authenticated for access to data stored in the data carrier by reading a secret code from the data carrier in a manner known only to an authorized terminal, and then displaying the read secret on the data carrier terminal. If the user determines that the displayed secret code is correct, the user then presents a biometric feature which is read and compared to the biometric data stored on the data carrier. If the read biometric data matches the stored biometric data, then the user is authorized for further use of the data carrier on the data carrier terminal.

3 Claims, 1 Drawing Sheet

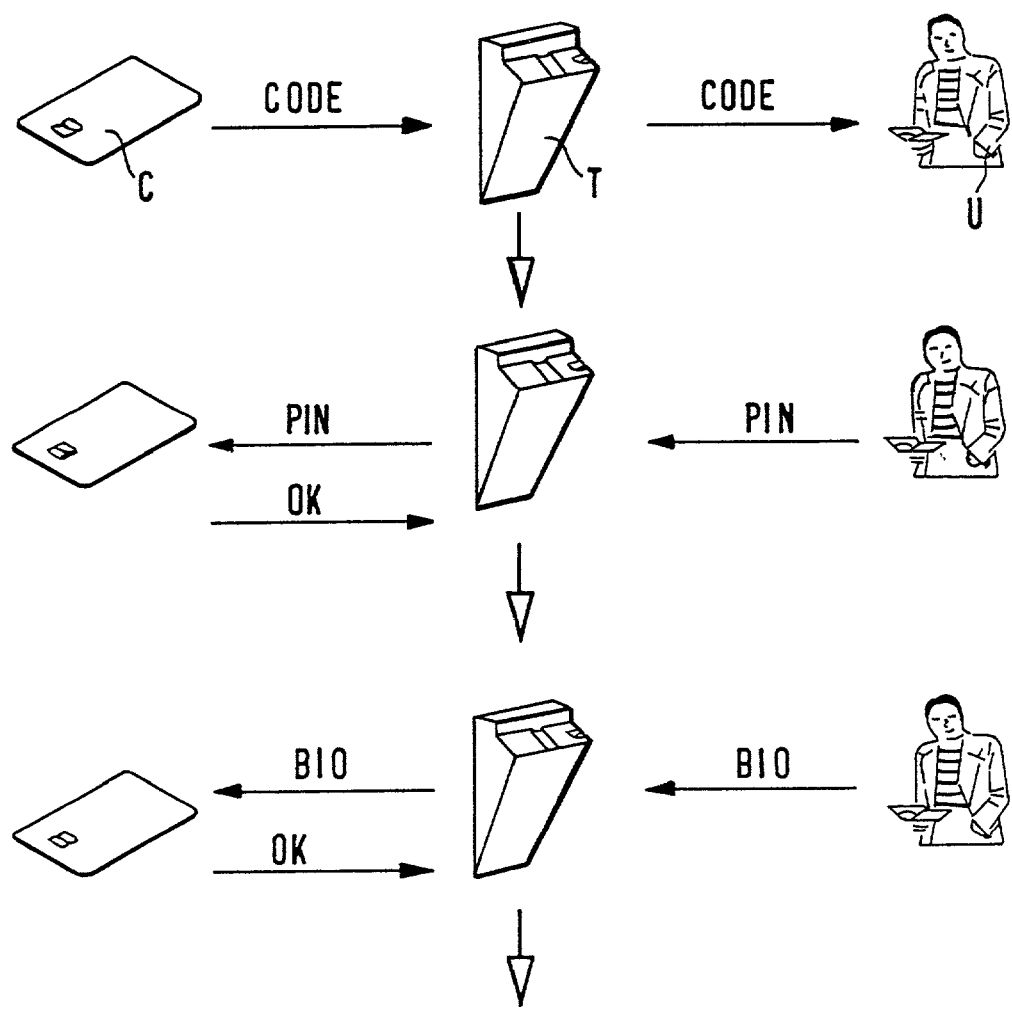

METHOD, DATA CARRIER AND SYSTEM FOR AUTHENTICATION OF A USER AND A TERMINAL

BACKGROUND OF THE INVENTION

1. Field of the Invention

The present invention relates in general to authentication for the use of data carriers such as smart cards and the like, and in particular to an authentication method, a data carrier and an authentication system comprising a data carrier and a terminal.

2. Description of Related Art

To prove that a user is actually entitled or authorized to use a smart card or magnetic stripe card, an individual secret number, for example a so-called PIN (personal identification number) is customarily used. The PIN is stored on the card and, after the card has been introduced into a terminal, compared with the PIN entered in the terminal by the user. If comparison is positive the terminal can e.g. access protected areas of the smart card, for example memory areas.

The use of PINs is problematic because the card can be used by anyone with knowledge of the PIN. The card is thus not bound to the actual card holder but to the PIN holder. Voluntary or involuntary transmission of the PIN thus makes it possible to abuse the card. PINs are also unsafe insofar as they can be forgotten, on the one hand, and spied out, on the other hand.

Even when an authorized user has identified himself by entering his PIN, the system is only partially authorized—that is, the user with respect to the card and to the terminal. There is no authorization of the terminal with respect to the card or to the user. If the terminal is fake there is a danger of the PIN being spied out by the fake terminal. The PIN alone therefore does not constitute sufficient protection because there is no authentication of the terminal with respect to the card or to the user.

U.S. Pat. No. 5,239,166 discloses a system for safe data exchange comprising a card and a terminal. In the known system the card and the terminal check each other. The user of the card is checked by means of biometric features, e.g. a fingerprint.

U.S. Pat. No. 5,208,447 discloses a method for checking terminals with a smart card wherein a password stored in the smart card is transmitted to the terminal in both encrypted and unencrypted form. The encrypted password is decrypted in the terminal and compared with the password transmitted in unencrypted form. If the decrypted password matches the unencrypted password, the terminal is authorized.

BRIEF SUMMARY OF THE INVENTION

The present invention is based on the problem of making the authentication process safer. In particular, the problem underlying the invention is to propose an authentication method, an authentication system comprising data carrier and terminal, and a data carrier for authenticating both the user and the terminal, thereby permitting the user's individual authorization and the authenticity of the terminal to be checked.

This problem is solved according to the invention by an authentication method, a data carrier and an authentication system according to the independent claims.

The subclaims state advantageous embodiments of the invention.

The inventive solution is based on the idea that the authentication process can be made safer if the authenticity of the terminal is first checked and the terminal is then presented with biometric data of the user. Biometric data, such as a fingerprint or the like, are clearly user-specific, unlike a PIN. The prior check of the terminal's authenticity guarantees that the sensitive, user-specific biometric data cannot be spied out. The terminal's authenticity is checked by a secret code permanently stored on the data carrier and known only to the user being read by the terminal and displayed to the user. Only if the secret code is displayed correctly does the user present the biometric feature to the terminal to identify himself as an authorized user to the terminal and the data carrier. The secret code can be stored on the data carrier on a memory location that can be accessed only by authorized terminals and/or be decrypted correctly only by an authorized terminal.

After the terminal has been authenticated, user-unique authentication with respect to the data carrier and to the terminal is obtained by presentation of the user-specific biometric feature and comparison of the data detected from the biometric feature with biometric data stored on the data carrier, in contrast to PIN comparison.

In addition to biometric authentication of the user, a PIN authentication of the user can be effected by entry of a PIN and comparison of the entered PIN with the PIN stored on the data carrier.

DETAILED DESCRIPTION OF THE DRAWINGS

FIG. 1 is a functional diagram of a method for authenticating a user and a terminal.

DETAILED DESCRIPTION OF THE PREFERRED EMBODIMENTS

The invention will be set forth in the following by way of example with reference to the single FIGURE.

The authentication process shown in the figure includes three steps, of which the second step can be omitted.

In the first step, terminal T reads a secret code (CODE) from a first memory area of data carrier C, for example a smart card, and presents said CODE to user U. CODE is stored on smart card C for example on a protected-access memory location and/or in encrypted form, so that CODE can only be read and displayed to user U by "real" terminal T which either has access authority or knows the decryption algorithm.

If user U recognizes CODE read by terminal T as his secret code, he will perform the further authentication steps. In the shown case, he will first enter his PIN in terminal T. The PIN is then transmitted, preferably in encrypted form, to smart card C where it is decrypted and compared with a PIN stored on smart card C, and the result of comparison is then reported to terminal T. The data transfer, in particular the transfer of CODE, the PIN and biometric data BIO to be described below, is preferably effected in encrypted form in order to protect said sensitive data from being spied out.

If the PIN comparison was positive ("OK"), terminal T continues the authentication process by now effecting the user-unique authentication by means of the user's biometric features. The user presents terminal T with a biometric feature, for example a fingerprint or the iris of an eye. The biometric feature is detected by terminal T and converted into biometric data BIO which are transmitted, preferably in encrypted form, to smart card C. There, the user's read biometric data are compared with biometric data stored on smart card C. In the case of a positive comparison ("OK"), terminal T is enabled for the entry of further user commands.

The invention claimed is:

1. A method for authenticating a user of a data carrier for authorized use of the data carrier and for authenticating a data carrier terminal for authorized accessing by the data carrier terminal of memory areas of the data carrier, comprising the following steps:

reading a secret code from the data carrier by the data carrier terminal, wherein the secret code is stored on a memory location that can be accessed only by authorized data terminals or can be decrypted correctly only by authorized data terminals;

presenting the read secret code to the user;

after receiving an indication by the user that the presented read secret code is correct, reading a biometric feature presented by the user;

comparing the read presented biometric feature with a biometric feature stored on the data carrier.

2. A method according to claim 1, further comprising a step wherein a PIN is in addition presented to the terminal and compared with a PIN stored on the data carrier.

3. A method according to claim 1 or 2, wherein a finger print of a user is used as the biometric feature.

* * * * *